United States Patent
De Koeijer et al.

(10) Patent No.: US 9,586,759 B2
(45) Date of Patent: Mar. 7, 2017

(54) METHOD FOR STORING CARBON DIOXIDE COMPOSITIONS IN SUBTERRANEAN GEOLOGICAL FORMATIONS AND AN ARRANGEMENT FOR USE IN SUCH METHODS

(75) Inventors: Gelein De Koeijer, Stavanger (NO); Jan Henrik Borch, Stavanger (NO)

(73) Assignee: STATOIL PETROLEUM AS, Stavanger (NO)

( * ) Notice: Subject to any disclaimer, the term of this patent is extended or adjusted under 35 U.S.C. 154(b) by 167 days.

(21) Appl. No.: 14/128,575

(22) PCT Filed: Jun. 30, 2011

(86) PCT No.: PCT/EP2011/061060
§ 371 (c)(1),
(2), (4) Date: Mar. 28, 2014

(87) PCT Pub. No.: WO2013/000520
PCT Pub. Date: Jan. 3, 2013

(65) Prior Publication Data
US 2015/0010357 A1    Jan. 8, 2015

(51) Int. Cl.
*B65G 5/00*      (2006.01)
*E21B 41/00*     (2006.01)
*E21D 13/00*     (2006.01)

(52) U.S. Cl.
CPC ............ *B65G 5/00* (2013.01); *E21B 41/0064* (2013.01); *E21D 13/00* (2013.01); *Y02C 10/14* (2013.01)

(58) Field of Classification Search
CPC ....... B65G 5/00; B65G 5/005; E21B 41/0064; E21B 43/164; E21B 43/12; Y02C 10/14
See application file for complete search history.

(56) References Cited

U.S. PATENT DOCUMENTS 6,149,344 A * 11/2000 Eaton .................. 405/129.28
2009/0202304 A1* 8/2009 Koide et al. ............ 405/129.2
(Continued)

FOREIGN PATENT DOCUMENTS

| CN | 101190743 A | 6/2008 |
|---|---|---|
| CN | 101679042 A | 3/2010 |

(Continued)

OTHER PUBLICATIONS

International Preliminary Report on Patentability received for PCT Patent Application No. PCT/EP2011/061060, mailed on Jan. 16, 2014, 7 pages.
(Continued)

*Primary Examiner* — John Kreck
*Assistant Examiner* — Carib Oquendo
(74) *Attorney, Agent, or Firm* — Morrison & Foerster LLP

(57) ABSTRACT

A method and arrangement are proposed for injecting $CO_2$ into a subterranean aquifer for storage therein. In order to reduce the effects of water evaporation from brine in the aquifer when dry $CO_2$ is injected into the aquifer, the $CO_2$ is supplied mixed with a salt-lean fluid, i.e. a fluid that contains a low concentration of ions that can precipitate out as salts. The mixing may take place at the wellhead, with the $CO_2$ salt-lean fluids supplied via separate low-grade material pipelines. The proportion of $CO_2$ and salt-lean fluid in the mixture is such as to obtain a $CO_2$ composition that is saturated with salt-lean fluid at the site of injection into the aquifer. By injecting saturated or "wet" $CO_2$, less water is evaporated from the brine and the salt precipitation is greatly reduced, so keeping the pore spaces clear and providing an increased accessible pore volume for $CO_2$ storage.

13 Claims, 1 Drawing Sheet

(56) References Cited

U.S. PATENT DOCUMENTS

| | | | | |
|---|---|---|---|---|
| 2010/0326924 | A1* | 12/2010 | Georgiou et al. | 210/747 |
| 2011/0035154 | A1* | 2/2011 | Kendall et al. | 702/14 |

FOREIGN PATENT DOCUMENTS

| | | | |
|---|---|---|---|
| CN | 101808717 A | 8/2010 | |
| EP | 1571105 A2 | 9/2005 | |
| GB | 2425824 A | 11/2006 | |
| JP | 3-258340 A | 11/1991 | |
| JP | 5-4043 A | 1/1993 | |
| JP | 6-182191 A | 7/1994 | |
| JP | 2008-307483 A | 12/2008 | |
| WO | 2008/058298 A1 | 5/2008 | |
| WO | 2009/061187 A2 | 5/2009 | |

OTHER PUBLICATIONS

International Written Opinion received for PCT Patent Application No. PCT/EP2011/061060, mailed on Dec. 9, 2011, 5 pages.

Gaus et al., "Geochemical and Solute Transport Modelling for CO2 Storage, What to Expect from it?", International Journal of Greenhouse Gas Control, vol. 2, 2008, pp. 605-625.

Maldal et al., "CO2 Underground Storage for Snohvit Gas Field Development", Energy, vol. 29, 2004, pp. 1403-1411.

Nghiem et al., "Optimization of Residual Gas and Solubility Trapping for CO2 Storage in Saline Aquifers", SPE 119080, 2009, pp. 1-10.

International Search Report received for PCT Patent Application No. PCT/EP2011/061060, mailed on Dec. 9, 2011, 3 pages.

Cooper et al., "A Technical Basis for Carbon Dioxide Storage", CO2 Capture Project®, 2009, 92 pages.

Metz et al., "Carbon Dioxide Capture and Storage", Intergovernmental Panel on Climate Change Special Report, 2005, 443 pages.

Wright et al., "An Overview of Active Large-Scale CO2 Storage Projects", SPE International Conference on CO2 Capture, Storage, and Utilization, Nov. 2-4, 2009, 29 pages.

Search Report received for Chinese Patent Application No. 201180072007.9, mailed on Sep. 6, 2015, 3 pages (English Translation only).

* cited by examiner

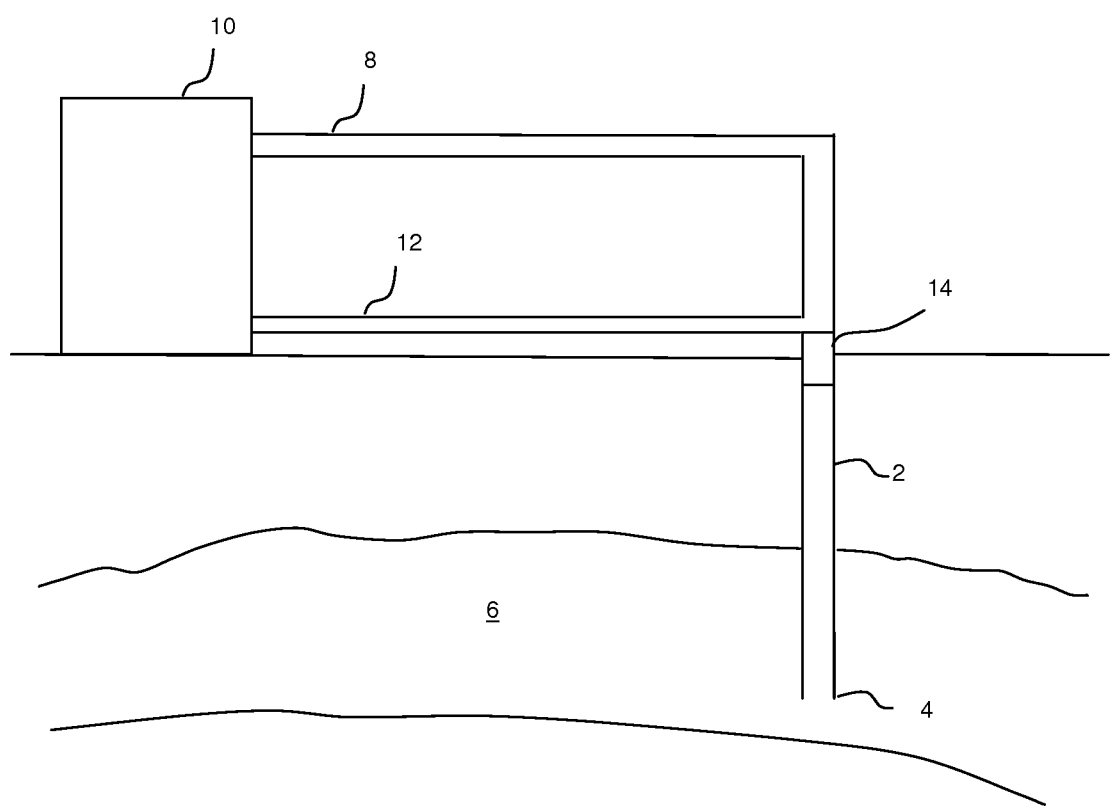

METHOD FOR STORING CARBON DIOXIDE COMPOSITIONS IN SUBTERRANEAN GEOLOGICAL FORMATIONS AND AN ARRANGEMENT FOR USE IN SUCH METHODS

CROSS REFERENCE TO RELATED APPLICATIONS

This application is a U.S. National Phase Patent Application of PCT/EP2011/061060, filed on Jun. 30, 2011, which is hereby incorporated by reference in the present disclosure in its entirety.

FIELD OF THE INVENTION

The invention relates to methods for introducing carbon dioxide ($CO_2$) into subterranean geological formations, specifically aquifers, and to arrangements for use in such methods.

BACKGROUND OF THE INVENTION

The increase of $CO_2$ in the atmosphere is thought to have a major effect on global climate. It is therefore desirable to reduce the emission of anthropogenic $CO_2$ into the atmosphere. In addition to the development of low $CO_2$ emission power plants, energy-saving automobiles and the increased use of renewable energy sources, the permanent storage of $CO_2$ in subterranean geological formations can be an important means for reducing net $CO_2$ emission.

An extensive review of existing $CO_2$ Capture and Storage (CCS) projects and technology is given in the IPCC Special report on Carbon Dioxide Capture and Storage (Carbon Dioxide Capture and Storage, IPCC, 2005, editors: Metz et al., Cambridge University Press, UK; also available at: http://www.ipcc.ch). The paper SPE 127096 "An overview of active large-scale $CO_2$ storage projects", I. Wright et al. presented at the 2009 SPE International Conference on $CO_2$ capture, Storage and Utilization held in San Diego, Calif., USA 2-4 Nov. 2009 provides a more recent update on existing large-scale $CO_2$ storage projects. Of the commercial scale projects reviewed in these documents, the most significant in terms of cumulative volume injected are the Sleipner and In Salah projects.

The Sleipner CCS Project is located 250 km off the Norwegian coast and is operated by Statoil. It is a commercial scale project for the storage of $CO_2$ in a subterranean aquifer in the Utsira formation at a depth of 800-1000 m below the sea surface. $CO_2$ produced during natural gas processing is captured and subsequently injected underground into the brine-saturated unconsolidated sandstone formation. $CO_2$ injection started in October 1996 and by 2008, more than ten million tons of $CO_2$ had been injected at a rate of approximately 2700 tons per day. A shallow long-reach well is used to take the $CO_2$ 2.4 km away from the producing wells and platform area. The injection site is placed beneath a local dome of the top Utsira formation.

The In Salah CCS Project is an onshore project for the production of natural gas from a gas reservoir located in a subterranean aquifer. The aquifer is located in the Sahara desert. The reservoir is in a carboniferous sandstone formation, 2000 m deep; it is only 20 m thick, and of low permeability. Natural gas containing up to 10% of $CO_2$ is produced. $CO_2$ is separated, and subsequently re-injected into the water-filled parts of the reservoir.

A known problem of $CO_2$ sequestration in aquifers, particularly saline aquifers is the risk of salt precipitation, which can impair the injection of $CO_2$. Salts are normally dissolved in formation water and can precipitate and form solids under certain conditions. When dry liquid or super-critical $CO_2$, also known as "dense state" $CO_2$, is injected into such formations, the water in the brine dissolves in the $CO_2$. As water is removed into the $CO_2$ stream, salt concentration increases, eventually reaching the solubility limit and giving rise to salt precipitation. The precipitated solids reduce the pore space available to the fluids, in some cases blocking the pore throats in the sedimentary rock. This impairs permeability near the wellbore, preventing fluid movement through the pores and may hinder any further injection of $CO_2$. This phenomenon occurs at the $CO_2$ injection points in and close to the borehole.

The book "$CO_2$ Capture Project, a technical basis for carbon dioxide storage" edited by Cal Cooper, ISBN 978-1-872691-48-0, suggests injecting fresh water prior to the $CO_2$ injection, in order to flush brine from the injection point. A further proposal is to use high injection rates in order to overcome the capillary forces with high fluid pressures. This latter proposal is limited by the supply of $CO_2$, the surface facility specifications and, of course, the fracture gradient of the cap rock.

The paper "Optimization of Residual Gas and Solubility Trapping for $CO_2$ Storage in Saline Aquifers" by Long Nghiem et al. presented at the 2009 Society of Petroleum Engineers Reservoir Simulation Symposium in Texas, USA, 2-4 Feb. 2009 proposes the use of a water injector above the $CO_2$ injector to accelerate and increase residual gas an solubility trapping in low-permeability aquifers. The water flows downwards and meets the $CO_2$, which flows upwards in the reservoir. The quantities of water required are considerable.

Two further publications, JP 3258340 A and WO 08/058298 propose the dissolution of $CO_2$ in water to generate carbonated water prior to its injection into a subterranean reservoir. In both cases, the quantities of water required are substantial.

In view of the above described state of the art it is an object of the present invention to provide an alternative method and arrangement for the permanent storage of $CO_2$ in aquifers where the risk of salt precipitation when injecting substantially pure $CO_2$ is high.

It is a further object of the present invention to provide a method and arrangement which allow for a more efficient use of the storage capacity of aquifers for permanent storage of $CO_2$.

SUMMARY OF THE INVENTION

The scope of the invention is defined by the appended independent claims. Preferred embodiments of the invention are defined by the dependent claims.

The invention relates to a method of introducing a $CO_2$ composition into a subterranean aquifer for storage of $CO_2$ therein, the method comprising the steps of: providing a supply of a mixture of a $CO_2$ composition and a salt-lean fluid, passing the mixture downwards via a shaft and injecting the mixture from the shaft into the aquifer, wherein the proportion of the $CO_2$ composition and the salt-lean fluid in the mixture is such as to obtain a $CO_2$ composition that is substantially saturated with the salt-lean fluid at the site of injection of the mixture into the aquifer.

By injecting a $CO_2$ composition that is saturated with a salt-lean fluid, and thus no longer dry, less water will be evaporated from the formation water at the site of injection. Hence, less salt will precipitate out and the pathways in the pore structure will be less obstructed by salt precipitates and the accessible pore volume will be considerably larger than when $CO_2$ is injected in a dry state.

In accordance with a preferred embodiment of the present invention, there is provided a supply of a salt-lean fluid and a separate supply of a $CO_2$ composition, wherein the rate of supply of each of the salt-lean fluid and the $CO_2$ composition is such as to obtain a $CO_2$ composition that is substantially saturated with the salt-lean fluid at the site of injection of said mixture into the aquifer. By separating the supplies of the salt-lean fluid and the dry $CO_2$ composition, the preferred low-grade material pipeline can be used without risk of corrosion.

Preferably, the required proportion of salt-lean fluid and $CO_2$ composition can be obtained by mixing the two supplies in a static mixer located at or close to the shaft In accordance with a particularly advantageous embodiment of the present invention, the proportions of the $CO_2$ composition and the salt-lean fluid in the mixture is such as to obtain a $CO_2$ composition that is between 50% oversaturated and 50% under-saturated, preferably between 10% oversaturated and 10% under-saturated, and most preferably between 5% oversaturated and 5% under-saturated with said salt-lean fluid at the site of injection of the mixture into the aquifer.

Advantageously, and in order to obtain a substantial reduction in the amount of precipitated salts at the injection site, the salt-lean fluid comprises less than 50% of the salinity of the formation water into which the $CO_2$ is injected, where the salinity is expressed in mass percent. In other words, the concentration of salts in the salt-lean fluid is preferably less than half of that of the formation water. In accordance with a preferred embodiment, the salt lean fluid has a salinity that is less than 25% of the salinity of the formation water.

The quantity of water or other salt-lean fluids required to saturate the $CO_2$ are not particularly high. It is thus an advantage of the present invention when the supply of salt-lean fluid and the supply of $CO_2$ composition are both obtained as secondary or side products from a processing plant. In addition, when the salt-lean fluid undergoes a costly treatment prior to discharge, such as biological treatment or demineralization, these costs can be offset by recycling this fluid at the $CO_2$ injection well.

The advantages of the present invention are also achieved by an arrangement for introducing a $CO_2$ composition into an aquifer comprising: a well including a shaft having an injection port for the injection of a $CO_2$ composition into the aquifer, a first conduit for supplying a $CO_2$ composition, the first conduit being connected to a wellhead portion of the shaft, a second conduit for supplying a salt-lean fluid, the second conduit being connected to a wellhead portion of the shaft, wherein the rate of flow of said $CO_2$ composition and said salt-lean fluid is such as to form a $CO_2$ composition that is substantially saturated with said salt-lean fluid at the site of injection of said mixture into the aquifer.

The proportions of salt lean fluid and $CO_2$ composition can be more accurately controlled in a particularly advantageous embodiment of the present invention when the arrangement comprises a mixer arranged at a wellhead portion of the shaft for mixing the $CO_2$ composition and the salt-lean fluid to form a $CO_2$ composition that is substantially saturated with the salt-lean fluid at the site of injection of the mixture into the aquifer. The mixer is preferably a static mixer that mixes by creating turbulence through a pressure drop rather than by the use of moving parts.

Advantageously, the arrangement further comprises a processing plant connected to the first and second conduits for providing a source of the substantially dry $CO_2$ composition and the salt-lean fluid. Salt-lean fluids, such as drainage water, are conventionally discharged from such processing plants in quantities that are entirely adequate to saturate the $CO_2$ composition. Recycling this fluid with the $CO_2$ composition provides a convenient and particularly advantageous way of increasing the $CO_2$ sequestration quantities.

BRIEF DESCRIPTION OF THE DRAWINGS

FIG. 1 schematically shows an arrangement for introducing $CO_2$ into a subterranean reservoir in accordance with the present invention.

DETAILED DESCRIPTION OF THE INVENTION

An "aquifer", within the context of the present invention shall be understood as being an underground layer of water-bearing permeable rock or unconsolidated materials (gravel, sand, silt, or clay). An aquifer, within the context of the present invention, may also be referred to as a "reservoir".

A "site of injection", within the context of the present invention, shall be understood as being a position adjacent an opening of an injection port, through which opening $CO_2$ is injected into an aquifer; said position being outside an outer surface of the conduit or well.

The present invention relates to methods for storing $CO_2$ in subterranean geological formations, in particular, in subterranean aquifers.

The $CO_2$ injected is preferably a $CO_2$ composition compressed to assume a liquid or supercritical state, also referred to as dense phase, at the site of injection, i.e., at reservoir conditions. The compressed gas may include $CO_2$ and additional compounds or impurities, such as lower alkanes, nitrogen and oxygen. These impurities preferably amount to less than 50% wt, 40% wt, 30% wt, 20% wt, 10% wt, 5% wt, 2% wt, most preferably to less than 1% wt, based on total compressed gas weight. The terms "$CO_2$ composition" and "$CO_2$", according to the invention, and depending on the context, may relate to the above described mixtures of $CO_2$.

The invention shall now be explained with reference to the appended figure.

FIG. 1 shows an arrangement for introducing $CO_2$ into an aquifer according to the present invention. A shaft 2 is provided to transport $CO_2$ from a level substantially above surface into a reservoir 6 within a subterranean formation. The shaft 2 may be in form of a tube disposed within the casing of a well. Alternatively, the casing of the well itself may constitute the shaft 2. The distal end of the shaft 2 terminates within the reservoir 6 in an injection port 4. $CO_2$ is injected via the shaft 2 into the reservoir 6 under controlled pressure and temperature and is a liquid or supercritical fluid at the injection port 4. In the illustrated embodiment, the well is a vertical well, however, it will be understood by those skilled in the art that it could alternatively be an inclined or deviated well or have a substantially vertical, or inclined upper (proximal) portion and a substantially horizontal distal portion. The well shaft 2 is connected at a proximal or wellhead end via a pipeline 8 to a processing plant 10 which produces $CO_2$ as a side or secondary product. For example, the processing plant may be a natural gas processing plant. In such a plant, the $CO_2$ is separated from the natural gas then conventionally compressed and dehydrated and before being transported via pipeline 8 to the well-head. The $CO_2$ obtained in this way may be pure $CO_2$ or may alternatively contain specific levels of contaminants, including the lower alkanes, methane, ethane, propane and butane. The pipeline 8 supplying the $CO_2$ is conventionally of mild steel (carbon steel) and would be subject to corrosion if $CO_2$ were not dehydrated first. This $CO_2$ dehydration thus avoids the need for a stainless steel pipeline over distances that can number many hundreds of kilometers.

In accordance with the present invention, a second pipeline 12 joins the shaft 2 at the wellhead and provides a source of salt-lean fluid. A "salt-lean fluid" in the context of the invention is a fluid containing low concentrations of ions that can precipitate. The salt concentration in the salt-lean fluid is preferably defined with reference to the salt concentration or salinity of the formation water, i.e. the water or brine already present at the injection site. Preferably the salt concentration of such a fluid is less than 50% of the salt concentration of the formation water and most preferably less than 25% of the salt concentration of the formation water. Examples of suitable salt-lean fluids include an aqueous fluid, such as water with a salt concentration of less than 1% wt. Another possibility is propylene glycol, also known as methyl ethylene glycol or MEG. Processing plants that produce $CO_2$ as a side product commonly have salt-lean fluid streams for various types of treatments. Examples of such streams are the knock-off water from the $CO_2$ compression train, wash water and steam condensate.

This salt-lean fluid is mixed with the $CO_2$ in the wellhead, preferably with a static mixer 14 provided there. The wellhead, shaft 2 and mixer 14 are typically made of high-grade stainless steel and thus are not subject to corrosion by the fluid-$CO_2$ mixture or "wet" $CO_2$ composition. In addition to the mixer 14, the shaft 2 may be provided with a compressor (not shown) upstream or downstream of the mixer 14 for adjusting the pressure of the $CO_2$-fluid mixture.

The proportion of salt-lean fluid to $CO_2$ mixed together is such as to provide salt-lean fluid saturated $CO_2$ at the injection site. In other words, the mixture is such that the $CO_2$ is around the saturation point or substantially saturated with the salt-lean fluid at the temperature and pressure prevailing in the reservoir at the point of injection.

The exact proportions of $CO_2$ and salt-lean fluid will thus depend on the conditions prevailing in each reservoir. For example, in the Sleipner project in which $CO_2$ is stored at a depth of between 800 and 1000 below sea level, the pressure and temperature in the reservoir are around 29° C. and 74 bar. In deeper reservoirs, such as at the Snøhvit project located in the Barents Sea offshore Norway at a depth of 2600 m below sea level, the prevailing pressure and temperature are considerably higher. Clearly the proportion of salt-lean fluid to $CO_2$ composition to obtain saturation will be higher at these higher temperature and pressures. It is possible to model the prevailing conditions at the injection site of any particular reservoir. Hence it is possible to set the required proportions at the well head.

While the ideal state is saturated $CO_2$, some margin is possible. Thus the $CO_2$ may be between 10% oversaturated and 10% under-saturated with the salt-lean fluid, preferably 10% oversaturated and 5% under-saturated with the salt-lean fluid and most preferably 5% oversaturated and 2% under-saturated with the salt-lean fluid. In any event, the mixture is not a liquid in which $CO_2$ is dissolved, but rather fluid-saturated or "wet" $CO_2$.

Since the $CO_2$ injected into the aquifer 6 is no longer dry, less water will be evaporated from the brine and consequently less salt will precipitate out. As a result, the pathways in the pore structure will be less obstructed by salt precipitates and the accessible pore volume will be considerably larger than when $CO_2$ is injected in a dry state. In addition, the quantities of water or other salt-lean fluids required to saturate the $CO_2$ are such that these fluids can be obtained entirely from the $CO_2$ source processing plant. When these fluids are subject to costly treatments, such as biological treatment or demineralization, these costs can be offset by the recycling of this fluid at the $CO_2$ injection well to increase the levels of $CO_2$ sequestration.

While the above description has centered on the arrangement illustrated in FIG. 1 with two separate pipelines supplying a $CO_2$ composition and a salt-lean fluid and a mixer at the wellhead to achieve the desired saturation or "wetness" of the $CO_2$ composition, it will be understood that the $CO_2$ composition and salt-lean fluid could be mixed upstream of the wellhead and supplied via a high-grade, corrosion-resistant pipeline to the well. In some cases, it may even be advantageous to pipe a "wet" $CO_2$ composition directly from the processing plant, i.e. omit the dehydration step, or modify this process in the plant to obtain the desired proportions of $CO_2$ composition and salt-lean fluid.

The invention claimed is:

1. A method of introducing a $CO_2$ and salt-lean fluid mixture into a subterranean aquifer for storage of $CO_2$ therein, said method comprising the steps of:
   providing a supply of a fluid-saturated or wet $CO_2$ mixture of a $CO_2$ composition and a salt-lean fluid, wherein the mixture is compressed to assume a liquid or supercritical state at a site of injection, and
   passing said mixture downwards via a shaft and injecting said mixture from said shaft into said aquifer at the site of injection,
   wherein proportions of said $CO_2$ composition and said salt-lean fluid in said mixture is such as to obtain the $CO_2$ and salt-lean fluid mixture in which the $CO_2$ composition is between 50% oversaturated and 50% under-saturated with said salt-lean fluid at the site of injection of said mixture into said aquifer.

2. The method as claimed in claim 1, wherein the step of providing said supply of said mixture includes:
   providing a supply of the salt-lean fluid and a separate supply of the $CO_2$ composition, wherein the rate of supply of each of said salt-lean fluid and said $CO_2$ composition is such as to obtain the $CO_2$ and salt-lean fluid composition.

3. The method as claimed in claim 2, further comprising the step of providing said supply of the salt-lean fluid and said separate supply of the $CO_2$ composition to a static mixer located at or close to said shaft.

4. The method of claim 3, wherein said step of providing said supplies of the salt-lean fluid and the $CO_2$ composition includes providing two separate pipelines for each supply, said pipelines terminating at said mixer.

5. The method of claim 1, wherein the proportions of said $CO_2$ composition and said salt-lean fluid in said mixture is such as to obtain the $CO_2$ and salt-lean fluid composition that is between 50% oversaturated and 50% under-saturated in which the $CO_2$ composition is between the 10% oversaturated and 10% under saturated, with said salt-lean fluid at the site of injection of said mixture into said aquifer.

6. The method according to claim 1, wherein said salt-lean fluid has a salt concentration that is less than 50% of the salt concentration of formation water present in said aquifer at the site of injection.

7. The method according to claim 1, wherein the step of providing a supply of the salt-lean fluid and providing a supply of the $CO_2$ composition includes obtaining said salt-lean fluid and $CO_2$ composition as side products from a processing plant.

8. An arrangement for introducing a $CO_2$ and salt-lean fluid mixture into an aquifer, said arrangement comprising:
  a well including a shaft having an injection port which injects a fluid-saturated or wet $CO_2$ mixture into the aquifer at a site of injection at a rate of flow,
  a first conduit for supplying a $CO_2$ composition which is compressed to assume a liquid or supercritical state at the site of injection, said first conduit being connected to a wellhead portion of said shaft,
  a second conduit for supplying a salt-lean fluid, said second conduit being connected to the wellhead portion of said shaft,
  wherein the rate of flow of said $CO_2$ composition and said salt-lean fluid is such as to form said mixture in which the $CO_2$ composition is between 50% oversaturated and 50% under-saturated with said salt-lean fluid at the site of injection of said mixture into said aquifer.

9. The arrangement as claimed in claim 8, further comprising a mixer arranged at the wellhead portion of said shaft for mixing said $CO_2$ composition and said salt-lean fluid to form said mixture.

10. The arrangement as claimed in claim 9, wherein said mixer is a static mixer.

11. The arrangement as claimed in claim 8, wherein the proportions of said $CO_2$ composition and said salt-lean fluid in said mixture is such as to obtain a $CO_2$ and salt-lean fluid composition in which the $CO_2$ composition is between 10% oversaturated and 10% under-saturated with said salt-lean fluid at the site of injection of said mixture into said aquifer.

12. The arrangement as claimed in claim 8, further comprising a processing plant connected to said first and second conduits for providing a source of a substantially dry $CO_2$ composition and the salt-lean fluid.

13. The arrangement as claimed in claim 8, wherein said salt-lean fluid comprises less than 5% wt of salts.

\* \* \* \* \*